Figure 1:
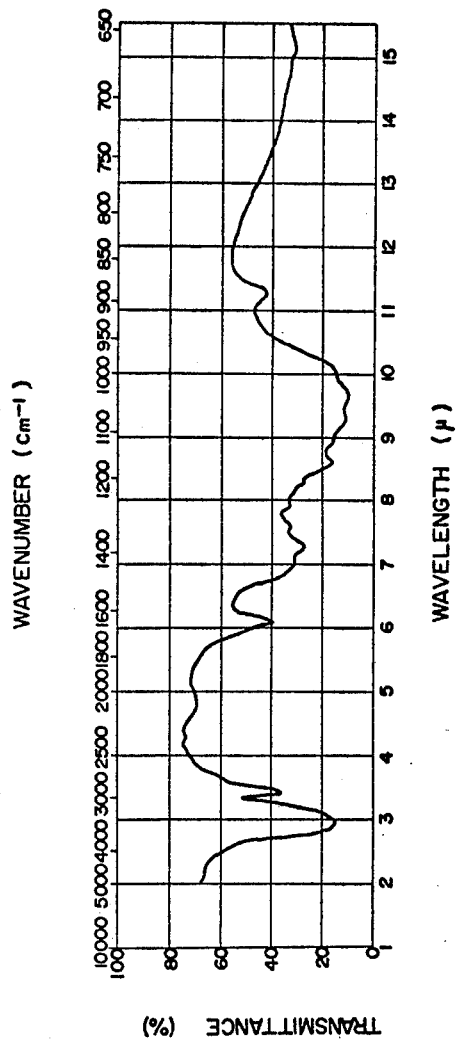

United States Patent [19]

Takahashi et al.

[11] 4,075,405
[45] Feb. 21, 1978

[54] β-1,3-GLUCAN DERIVATIVES

[75] Inventors: Takeshi Takahashi, Tondabayashi; Yoshio Yamazaki, Toyonaka; Koichi Kato, Neyagawa, all of Japan

[73] Assignee: Takeda Chemical Industries, Ltd., Osaka, Japan

[21] Appl. No.: 635,450

[22] Filed: Nov. 26, 1975

[30] Foreign Application Priority Data

Nov. 26, 1974 Japan .................................. 49-136477
Nov. 26, 1974 Japan .................................. 49-136478
Oct. 21, 1975 Japan .................................. 50-127197

[51] Int. Cl.² ...................... A61K 31/71; C08B 37/00; C12D 13/04
[52] U.S. Cl. ...................................... 536/1; 195/31 P; 424/180; 536/114
[58] Field of Search ........................ 260/209 R; 536/1

[56] References Cited

U.S. PATENT DOCUMENTS

| | | | |
|---|---|---|---|
| 3,396,082 | 8/1968 | Davis et al. | 260/209 R |
| 3,423,288 | 1/1969 | Hallack et al. | 260/209 R |
| 3,645,852 | 2/1972 | Axen et al. | 260/112.5 R |
| 3,759,896 | 9/1973 | Komatsu et al. | 260/209 R |
| 3,822,250 | 7/1974 | Kimura et al. | 260/209 R |
| 3,870,537 | 3/1975 | Hijiya et al. | 260/209 R |
| 3,899,480 | 8/1975 | Kimura et al. | 260/209 R |
| 3,900,462 | 8/1975 | Komatani et al. | 260/209 R |

Primary Examiner—Johnnie R. Brown
Attorney, Agent, or Firm—Wenderoth, Lind & Ponack

[57] ABSTRACT

β-1,3-Glucan derivatives, which are produced by reacting a water-insoluble β-1,3-glucan with a cyanogen halide, are a useful water-insoluble carrier of high reactivity for the production of water-insoluble enzymes and of carrier-ligand products suitable for affinity chromatography.

8 Claims, 2 Drawing Figures

β-1,3-GLUCAN DERIVATIVES

This invention relates to β-1,3-glucan derivatives which comprises reacting a water-insoluble β-1,3-glucan with cyanogen halide.

It is an object of this invention to provide a water-insoluble carrier of high reactivity useful for the production of water-insoluble enzymes and of columns for affinity chromatography.

Other objects will become clear hereinafter as the disclosure proceeds.

A general method comprising activating a polysaccharide with a cyanogen halide to obtain a derivative ready to bind, covalently with substances containing primary or secondary amino groups is described, for example, in Nature 214, 1302(1967) and U.S. Pat. No. 3,645,852, and literatures relating to producing water-insoluble enzymes and ligandbound matrices for affinity chromatography according to this general method are really enumerous.

However, none of these literatures reports about the use of β-1,3-glucans as carriers.

The activation reaction with a cyanogen halide is commonly carried out at alkaline pH and, particularly, in the neighborhood of pH 11. However, β-1,3-glucans are so liable to dissolve under such pH conditions that the direct application of the known general method as such does not provide the desired activated water-insoluble β-1,3-glucans.

The present inventors conducted an intensive study of the conditions for the activation reaction of water-insoluble β-1,3-glucans with a cyanogen halide and succeeded in the activation of the β1,3-glucans while they are allowed to retain their form.

The water-insoluble β-1,3-glucan to be employed for the purposes of this invention is exemplified by the polysaccharides elaborated by microorganisms belonging to the genus Alcaligenes or the genus Agrobacterium. More particularly, there may be mentioned the polysaccharide produced by Alcaligenes faecalis var. myxogenes 10C3K (Agricultural Biological Chemistry, Vol. 30, pages 196 et seq. (1966) by Harada et al.), the polysaccharide produced by the mutant strain NTK-u (IFO 13140, ATCC 21680) of *Alcaligenes faecalis var. myxogenes* 10C3K (U.S. Pat. No. 3,754,925, U.S. Pat. No. 3,822,250) (hereinafter referred to as PS-1), the polysaccharide produced by *Agrobacterium radiobacter* (IFO 13127, ATCC 6466) or its mutant strain U-19 (IFO 13126, ATCC 21679) (U.S. Pat. No. 3,754,925, U.S. Pat. No. 3,822,250) (hereinafter referred to as PS-2) and pachyman which occurs in the crude drug known as *Poria cocos* (Agr. Biol. Chem. Vol. 32, No. 10, P.1261(1968).

The water-insoluble β-1,3-glucan to be employed in the activation reaction of this invention may be in the form of either powder or shaped articles, which are prepared by taking advantage of the fact that water-insoluble β-1,3-glucans can be formed into various shapes according to their specific physical characteristics, for example, fiber, film, bead or small ball and the like, or microcapsule by coating said glucan onto a core material.

As for the method of forming such water-insoluble β-1,3-glucans into shaped articles, any of the procedures commonly used in this particular field of art can be applied. For example, to obtain a fibrous article, one may follow the procedure which consists of dissolving a water-insoluble β-1,3-glucan in an aqueous solution of sodium hydroxide and, then, extruding the resultant β-1,3-glucan solution from a nozzle into an aqueous solution of hydrogen chloride and, thereby, neutralizing the solution and causing the glucan to undergo gelation (U.S. Pat. No. 3,899,480).

A film of such a water-insoluble β2-1,3-glucan can be prepared, for example, by the steps of dissolving the water-insoluble β-1,3-glucan in an aqueous solution of potassium hydroxide, coating the solution onto a flat glass plate to a uniform thickness and, finally, immersing the coated glass plate in an aqueous solution of hydrogen chloride so as to neutralize the film and cause the glucan to undergo gelation (U.S. Pat. No. 3,899,480). The β-1,3-glucan can be shaped into beads, for example, by the following alternative procedures; the method which comprises extruding, dripping or spraying a fluid containing a water-insoluble β1,3-glucan into a heated oil bath and, thereby, causing the glucan to undergo gelation (Japanese Patent Application Laid Open No. 52953/1973), the method which comprises dissolving said water-insoluble β-1,3-glucan in an aqueous solution of sodium hydroxide and feeding the resultant solution through a drip nozzle into an aqueous solution of hydrogen chloride to neutralize and cause the glucan to undergo gelation (U.S. Pat. No. 3,899,480), the method which comprises dispersing an alkaline aqueous solution of the water-insoluble β-1,3-glucan in an organic solvent which is not readily miscible with water and adding an organic acid to the resultant dispersion, and the method which comprises adding a core material to an alkaline aqueous solution of the water-insoluble β-1,3-glucan and dispersing the mixture in an organic solvent which is not readily miscible with water followed by adding an organic acid to the resultant dispersion. (These last two methods are described in the specification of the Japanese Patent Application filed on Oct. 21, 1975 in the name of the same applicant as that of this application, the title of the invention being Method for Producing Gels in the Shape of Beads).

The following are two specific examplary procedures for the method for producing gels in the shape of beads of water-insoluble β-1,3-glucan shown in said Japanese Patent Application filed on Oct. 21, 1975.

(a) To 9 grams of PS-1 powder was added 270 ml of distilled water and the mixture was stirred to the consistency of a slurry. To this slurry was added 30 ml of 1N aqueous sodium hydroxide solution, whereupon the PS-1 was dissolved. A beaker with a capacity of 2 liters was charged with 1200 ml of toluene and 6 g. of Emalex ® HC-30 (a surfactant available from Japan Emulsion K.K., Japan; polyoxyethylenehydrogenated castor oil derivative) and, under agitation at 800 r.p.m. by a screw-type stirrer, the above alkaline solution of PS-1 was added dropwise at room temperature.

Then, under stirring at 800 r.p.m., the resultant PS-1 dispersion was further added to a mixture of 2000 ml toluene and 100 ml acetic acid. The stirring was continued for about an hour and the system was allowed to stand at room temperature for about 3 hours, during which time the gelation product settled.

The solvent was removed by decantation and the sediment was rinsed five times with 2-liter portions of distilled water, which treatment made the sediment neutral and free of the organic solvent. The procedure provided 240 ml of PS-1 gel in the form of bead.

(b) To 3 grams of PS-1 powder was added 144 ml of distilled water as well as 16 ml of 1N aqueous sodium hydroxide solution, whereby the powder was dissolved. To this solution was added 9 g. of SIRASU beads (40–80 mesh, manufactured by Sanki Kogyo K.K., Japan), followed by stirring. Under agitation at 360 r.p.m., the above mixture was added dropwise and dispersed in a solution of 2 g. of Emalex ® HC-30 in 600 ml of toluene. To the resultant mixture was added 15 ml of acetic acid and the resultant gel was recovered as a cake by filtration through a nylon filter cloth. The cake was rinsed with water. The solid article thus obtained was shown microscopically to be of bead form (20 to 40 mesh) containing SIRASU as core in PS-1 gel.

As the cyanogen halide which is an activating agent, there may normally be employed the bromine, chlorine or iodine compound or a mixture of such compounds.

The alkali to be employed according to this invention is exemplified by caustic alkali, such as sodium hydroxide or potassium hydroxide, etc. and, normally, is preferably used in 1 to 5N aqueous solution. Desirably the alkali is added until a pH value of 9 to 13 is established, pH about 11 being particularly preferred. The alkali is added gradually so as to prevent dissolution of the water-insoluble $\beta$-1,3-glucan, generally the rate of addition being preferably in the range of about 0.2 to 0.5 pH unit/minute.

The following is a specific example of the activation reaction of a water-insoluble $\beta$-1,3-glucan with a cyanogen halide.

One part of a powdery water-insoluble $\beta$-1,3-glucan was suspended in 20 volume parts of water, followed by the addition of 20 volume parts of water containing 0.1 to 3 parts of a cyanogen halide. Under stirring at an optional temperature of 0° to 50° C, the pH of the reaction mixture was increased to pH 11 by the dropwise addition of a 2N solution of sodium hydroxide at a rate that would not cause dissolution of the glucan (about 0.5 pH unit per minute). The reaction mixture was then maintained at pH 11 for 15 minutes, whereby the activation reaction was carried to completion. Following the reaction, the solid fraction was recovered by filtration and rinsed with 100 volume parts of water. The above procedure provided a powdery activated $\beta$-1,3-glucan. This activated $\beta$-1,3-glucan is insoluble in water and alkali solutions; is thermally ungelable and hydrophilic; and is comprised of particles of such size and strength as will give an adequate flow rate when packed into columns. Therefore, this $\beta$-1,3-glucan can be processed by procedures such as the following to obtain water-insoluble enzymes with excellent properties or carrier-ligand products suitable for affinity chromatography.

The production of such a water-insoluble enzyme or a carrier-ligand product for affinity chromatography is carried out, for example by reacting the above activated $\beta$-1,3-glucan with a substance containing primary or secondary amino groups, for example an enzyme, protein, peptide, amino acid, an enzyme substrate or inhibitor, antigen, antibody, hormone or the like, preferably in weakly alkaline aqueous solution and at an optional temperature in the range of about 0° to 50° C.

An enzyme which is bound to an activated $\beta$-1,3-glucan can be packed into a bed and be utilized as a reactor for chemical reactions. In this connection, a solution of a substrate can be passed through the enzyme bed to convert this substrate into a valuable product.

The reaction is automatically stopped when the solution leaves the bed. The solid enzyme can be used for a long time in a continuous operation.

Another valuable example is antibodies bound to water-insoluble $\beta$-1,3-glucans. Such products can be combined specifically with the corresponding antigen, for example, for the analytical determination of the latter.

For example, a water-insoluble enzyme of $\alpha$-amino acid ester hydrolase can be prepared by binding covalently an $\alpha$-amino acid ester hydrolase as elaborated by a microorganism to a cyanogen halide-activated water-insoluble $\beta$-1,3-glucan.

It is well known that many of the bacteria belonging to the family Pseudomonadaceae are able to hydrolyze $\alpha$-amino acid esters including 2-phenylglycine methyl ester and, in the presence of a suitable acyl acceptor, to induce a transacylation reaction and that semi-synthetic penicillins or semi-synthetic cephalosporins can be produced by taking advantage of those bacteria (T.Takahashi et al., J. Amer. Chem. Soc. 94, 4035(1972); T. Takahashi et al, Biochem. J. 137, 497(1974); U.S. Pat. No. 3,749,642, U.S. Pat. No. 3,816,253; etc.]. However, because the methods thus far proposed invariably depend on bacterial cells for an enzyme source, there is involved autolysis or an aging loss of activity, which virtually precludes the cells from repetitive use and provides only a low utilization efficiency of the enzyme. Furthermore, these methods have the disadvantage that the reaction system is soiled or otherwise spoiled by partial elution or leakage of cell components into the system or by infiltration of the medium ingredients which, often, have attached themselves to the bacterial cells. The result is that in the production of penicillins or cephalosporins for use in injectable dosage forms, much time and labor are required for the purification of the product compounds.

To overcome the foregoing disadvantage the present inventors undertook an intensive research to develop a method for converting an $\alpha$-amino acid ester hydrolase into a water-insoluble form.

As the bacteria capable of elaborating $\alpha$-amino acid ester hydrolases which are to be employed, there may be employed, for example, the bacteria of the following genera: Xanthomonas, Acetobacter, Gluconobacter, Pseudomonas, Aeromonas, Protaminobacter, Mycoplana and so on. This enzyme is a hydrolytic enzyme which is able to hydrolyze $\alpha$-amino acid esters, e.g. D-phenylglycine methyl ester, and, at the same time, has the activity to synthesize Cephalexin from D-phenylglycine methyl ester and 7-amino-3-deacetoxycephalosporanic acid (hereinafter referred to briefly as 7-ADCA). Furthermore, this enzyme has the activity to synthesize Ampicillin and Amoxicillin from D-phenylglycine methyl ester and D-p-hydroxyphenylglycine methyl ester, respectively, and 6-aminopenicillanic acid (hereinafter referred to briefly as 6-APA), as well as the activity to hydrolyze racemic $\alpha$-amino acid esters with optical specificity. Because the particular enzyme is intracellularly elaborated, it is necessary, in the first place, to disrupt the cells and prepare a cell-free extract. This disruption of cells may be accomplished by using one or, in a suitable combination, two or more of the known cell-disruption methods such as the lysozyme-EDTA method, ultrasonic distruption, French-press method and so on. The resultant suspension of disrupted cells is centrifuged to obtain a cell-free extract. This fluid can be directly subjected to the coupling reaction with a water-insoluble high molecular polysaccharide or subjected to simple partial purification according to a known enzyme purification procedure before it is used in the immobilization reaction.

It should, however, be understood that all α-amino acid ester hydrolases are not always used for the present immobilization reactions in the form of crude enzymatic products of low purity.

Therefore, to select the α-amino acid ester hydrolase useful for this reaction, the following test is provided. Thus, a water-insoluble enzyme is first produced by the procedure set forth hereinafter in Reference Example 12 and, if the specific activity of this enzyme is not less than twice the specific activity of the original crude enzyme, this enzyme is judged to be useful for the purposes of this reaction.

The coupling reaction between the crude preparation of thus-selected enzyme and the activated high molecular polysaccharide is carried out in aqueous medium which may be weakly acid, neutral or weakly alkaline, the reaction temperature being preferably not exceeding 40° C.

The reaction time is commonly within the range of about 1 to 20 hours, although it is dependent upon the reaction temperature selected. Following the reaction, the resultant water-insoluble enzymatic article is recovered by filtration and rinsed somehow to remove the adherent or adsorbed impurities.

To synthesize a semi-synthetic penicillin or cephalosporin using the water-insoluble α-amino acid ester hydrolase article thus produced, one may employ whichever of the batch reaction and the continuous reaction procedure. In the batch procedure, the water-insoluble enzymatic article is suspended in a solution of the substrates and the reaction is allowed to take place under the optimum pH and temperature conditions for a given time. Then, the reaction mixture is filtered or centrifuged to recover the water-insoluble enzymatic article. In this manner, the water-insoluble enzymatic article can be used time and again.

In the continuous reaction procedure, the water-insoluble enzymatic article is packed into a column, through which an aqueous solution containing the substrates, i.e. α-amino acid ester and 6-APA or 7-aminocephem compound as the case may be, is then passed. This procedure provides a semi-synthetic penicillin or cephalosporin continuously and in high yield. The resultant reaction product mixture (batch reaction) or column effluent (continuous reaction) is exclusively comprised of the contemplated product compound, unreacted substrates, and the by-product α-amino acid and alcohol. Therefore, one may not only easily produce the contemplated compound of high purity grade but also recover the starting materials with extreme ease. Furthermore, the water-insoluble enzyme packed into the column does not undergo any substantial reduction in α-amino acid ester hydrolase activity even when used continuously for a cephalosporin-synthetic reaction at 5° C for 6 months.

In this example, the amount of cephalosporin synthesized by the water-insoluble enzyme during this six-month period was comparable to the amount of cephalosporin obtained by using the microbial cells employed in the preparation of the same water-insoluble enzyme about 100 times in repetition. The example clearly indicates how the continuous cephalosporin synthetic method using the water-insoluble enzymatic article is superior even from the standpoint of effective utilization of an enzyme.

The following reference and working examples are intended merely to illustrate presently preferred embodiment to the present invention and not to restrict the scope of this invention.

Reference Example 1

The powdery PS-1, bead-shaped PS-1, fibrous PS-2 and film-shaped PS-1, which had been activated with cyanogen bromide in Examples 1 and 4 to 6, respectively, had the following properties.

(1) Shape

Untreated powdery PS-1 on swelling in distilled water assumed a shape like a deflated rubber ball, ranging from 20 to 500 μ in diameter, the peak mean diameter being about 50 μ. Activated powdery PS-1 was found to be substantially identical with untreated powdery PS-1 in shape and in particle size.

In each instance of the bead-shaped PS-1, fibrous PS-2 and film-shaped PS-1, substantially no change was observed in shape between the unactivated glucan and the activated glucan.

(2) Thermo-gelation property

Unlike the corresponding unactivated glucans, the activated glucans had no thermo-gelation property at all, no gelation taking place even after 15 minutes' heating in boiling water.

(3) Solubility

Unlike the unactivated glucans, the activated glucans could not be dissolved at all in aqueous solutions of strong alkalis, dimethylsulfoxide and concentrated solutions (8M) of urea.

(4) Analysis for nitrogen

Determination for N by elemental analysis showed that the numbers (average) of nitrogen atoms introduced by the activation treatment were 0.43 per glucose residue in the case of PS-1 powder, 0.45 for PS-1 beads, 0.36 for fibrous PS-2 and 0.29 for PS-1 film.

(5) Infrared absorption spectra (KBr)

Figure 2:
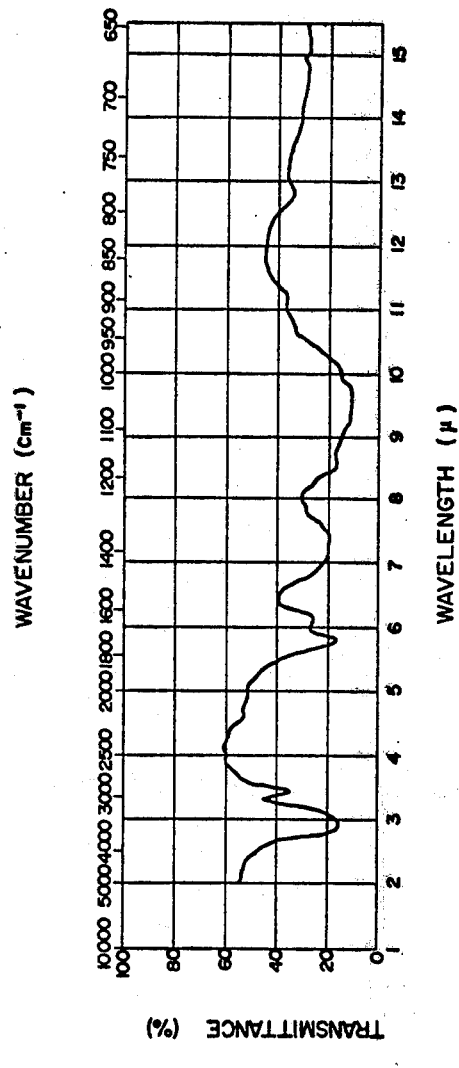

The infrared absorption spectrum of untreated powdery PS-1 is reproduced in FIG. 1 and the corresponding spectrum of activated PS-1 is reproduced in FIG. 2. Comparison of the two spectra revealed new absorption bands at 1730 cm$^{-1}$, 1625 cm$^{-1}$ and 780 cm$^{-1}$ in the case of activated powdery PS-1. Apparently, the absorption at 1730 cm$^{-1}$ was attributable to the carboxyamide and the absorptions at 1625 cm$^{-1}$ and 780 cm$^{-1}$ were attributable to the imidocarbonate.

The bead-shaped PS-1, fibrous PS-2 and film-shaped PS-1 invariably showed also absorption maxima characteristic of carboxyamides (1730 cm$^{-1}$) and imidocarbonates (1625 cm$^{-1}$, 780 cm$^{-1}$).

(6) Dyeability

The dyeability of these activated glucans was investigated using water-soluble dyes according to the method of Nakanishi et al (Carbohydrate Research 32, 47-52(1974). The results are set forth in Table 1.

Table 1

| Dye Sample | Dyeability Test | | | | | |
| --- | --- | --- | --- | --- | --- | --- |
| | Aniline blue | Brilliant blue | Trypan blue | Congo red | Toluidine blue O | Methylene blue |
| PS-1 powder (untreated) | + | + | + | + | − | − |
| PS-1 powder (activated) | + | − | + | + | − | − |
| PS-1 beads (untreated) | + | − | − | + | − | − |
| PS-1 beads (activated) | + | − | + | + | − | − |
| PS-2 fiber | + | − | − | + | − | − |

Table 1-continued

| Dye Sample | Dyeability Test | | | | | |
|---|---|---|---|---|---|---|
| | Aniline blue | Brilliant blue | Trypan blue | Congo red | Toluidine blue O | Methylene blue |
| (untreated) PS-2 fiber | + | − | + | + | − | − |
| (activated) PS-1 film | + | + | − | + | + | + |
| (untreated) PS-1 film (activated) | + | + | + | + | + | − |

Reference Example 2

One gram (dry weight) of the activated PS-1 obtained in Example 1 was suspended in distilled water to make 20 ml of a suspension. To this were added 10 ml of 0.2M carbonate buffer (pH 8.5), 2 ml of a 20 mg./ml solution of pronase (manufactured by Kaken Kagaku K.K., Japan) and 8 ml of distilled water. The mixture was reacted at 5° C and pH 8.5 with stirring for 20 hours. Following this reaction, the PS-1 gel was recovered by means of a glass filter and rinsed with 80 ml of 0.2M glycine solution, 80 ml of 0.5M sodium chloride solution and 40 ml of distilled water in the order mentioned. The procedure provided a water-insoluble enzymatic product of pronase. Using p-toluene-sulfonyl-L-arginine methyl ester which is a synthetic substrate, the pronase activity of the above article was assayed at 25° C and pH 8.0. The result showed that 63% of the pronase activity used in the coupling reaction had been converted to the water-insoluble enzyme.

The total protein in the washings recovered in the above procedure was determined by the method of Lowry [O. H. Lowry et al; J. Biol. Chem. 193,265(1951)] and substracted from the protein content of the pronase originally used. The percent insolubilization of protein thus calculated was 77%.

Reference Example 3

One gram of the activated PS-1 obtained in Example 1 was suspended in distilled water to prepare 20 ml of a polysaccharide suspension. To this suspension were added 10 ml of 0.2M Tris-HCl buffer (pH 8.0) and 10 ml of a 2.5 mg./ml solution of crystalline α-amylase (manufactured by Sankyo K.K., Japan). The mixture was reacted at 5° C and pH 8.0 for 4 hours, after which the gel was rinsed in the same manner as Reference Example 2 to obtain a water-insoluble α-amylase.

The α-amylase activity of this article was assayed by reacting it with soluble starch as the substrate at pH 5.3 and 37° C. The percent insolubilization of activity was found to be 59%. The percent insolubilization of protein was 65%.

Reference Example 4

One gram of the activated PS-1 obtained in Example 1 was suspended in distilled water to prepare 20 ml of a suspension. To this suspension were added 10 ml of 0.2M phosphate buffer (pH 8.0) and 10 ml of a 2.5 mg./ml solution of crystalline α-chymotrypsin (manufactured by Sigma, U.S.A.). The coupling reaction was carried out at 5° C and pH 8. The reaction went to completion in 2 hours. By the above procedure, 78% of the initial enzyme protein was coupled to the PS-1.

Using L-tyrosine ethyl ester as the substrate, the esterase activity was assayed in the presence of 10% ethanol at 27° C and pH 7.8. The percent insolubilization of activity was found to be 64%.

Reference Example 5

In 20 ml of distilled water was suspended 1 g. of the activated PS-1 obtained in Example 1, followed by the addition of 10 ml of 0.2 M Tris-HCl buffer (pH 8.0) and 10 ml of a 2.5 mg./ml solution of wheat germ acid phosphatase (maufactured by Seikagaku Kogyo K.K., Japan).

The mixture was reacted at 5° C and pH 8.0 with stirring for 18 hours, after which time the resultant reaction product was rinsed as in Reference Example 2 to obtain a water-insoluble acid phosphatase. Using O-carboxyphenyl phosphate as the substrate, the activity of the above product was assayed at 25° C and pH 5.0. The result showed that 52% of the initial activity of the enzyme had been insolubilized. The percent insolubilization of protein was found to be 63%.

Reference Example 6

One gram of the activated PS-1 obtained in Example 1 was suspended in distilled water to obtain 20 ml of a suspension. To this suspension were added 5 mg. of an α-amino acid ester hydrolase extracted from the cells of *Acetobacter turbidans* ATCC 9325 and partially purified [as to the method for producing the enzyme and its various properties, see T. Takahashi et al, Biochem. J. 137, 497(1974)] and 20 ml of 0.1M Tris-HCl buffer (pH 8.0).

The mixture was reacted at 5° C and pH 8.0 with stirring for 4 hours. Following this reaction, the PS-1 gel was recovered by filtration and rinsed in the same manner as Reference Example 2. The water-insoluble enzyme thus obtained was suspended in distilled water to prepare 40 ml of a suspension.

Using D-phenylglycine methyl ester as the substrate, the activity of this insoluble enzyme suspension was assayed. The activity was found to be 9.83 units/ml. The result showed that 84% of the initial activity of the enzyme had been insolubilized. The percent insolubilization of protein was found to be 69%.

Using 25 ml of the above water-insoluble enzyme suspension, a small-sized column with a bed volume of 5 ml was prepared and a substrate solution (pH 7.2) containing 15 mg./ml of D-phenylglycine methyl ester hydrochloride, 5 mg/ml of 7-amino-3-desacetoxycephalosporanic acid and 10% (V/V) of methanol was passed through the column at a constant flow rate of 12 ml/hr. The effluent reaction mixture emerging from the column was found to contain 7.50 mg/ml of Cephalexin. This reaction was conducted for 6 consecutive months. It was found that the cephalexin-synthesizing activity of the column had not dropped at all by the end of this period.

Reference Example 7

One gram of the activated PS-1 obtained in the same manner as Example 1 was suspended in distilled water to prepare 20 ml of a suspension. To this suspension was added 20 ml of 0.1M Tris-HCl buffer (pH 8.0) in which 20 mg. of L-leucylglycylglycine (manufactured by Mann Research Laboratories, U.S.A.) had been dissolved. The mixture was reacted at 5° C and pH 8 with gentle stirring for 16 hours. Thereafter, the PS-1 gel was recovered by filtration and rinsed as in Reference Example 2.

As computed from the L-leucylglycylglycine content of the washings, the amount of L-leucylglycylglycine coupled to the PS-1 was found to be 12.6 mg.

The above reaction procedure was repeated similarly using human serum γ-globulin (Fraction II, manufactured by Sigma, U.S.A.) or insulin (manufactured by Sigma, U.S.A.), in lieu of L-leucylglycylglycine. The amounts of γ-globulin and insulin, thus coupled to PS-1, were 15.1 mg. and 11.0 mg., respectively.

Reference Example 8

Of the activated PS-1 beads, activated PS-2 fiber and activated PS-1 film which had been prepared in Example 4 to 6, respectively, one gram (on a dry basis) each was taken and 20 ml of distilled water, 10 ml of a 1% (W/V) aqueous solution of p-aminophenethyl alcohol and 10 ml of 0.04M phosphate buffer (pH 6) were added. Under stirring, the reaction was carried out at 5° C and pH 6 for 24 hours. The reaction mixture was filtered and the solid matter was rinsed wth 200 ml of 0.5M aqueous NaCl solution. The amount of p-aminophenethyl alcohol coupled in the above reaction was calculated from the amount of p-aminophenethyl alcohol recovered in the above filtrate. The amounts of p-aminophenethyl alcohol thus coupled were found to be 47 mg. in the case of PS-1 beads, 33 mg. for PS-2 fiber and 24 mg. for PS-1 film (all figures based on each gram of carrier). Each of these figures are considered to correspond to the amounts of active group (imidocarbonate group) introduced into the carrier by the activation reaction.

Reference Example 9

One gram (on a dry-weight basis) of the activated PS-1 beads obtained in accordance with Example 4 were suspended in 40 ml of distilled water, followed by the addition of 10 ml of 0.2M carbonate buffer (pH 8.5), 5 ml of a 20 mg./ml solution of pronase (manufactured by Kaken Kagaku Kabushiki Kaisha, Japan) and 5 ml of distilled water. The reaction was carried out at 5° C and pH 8.5 for 6 hours, with constant stirring. Following this reaction, the bead-shaped PS-1 gel was recovered by means of a glass filter and rinsed with 120 ml of 0.2M glycine solution, 120 ml of 0.5M sodium chloride solution and 80 ml of distilled water in the order mentioned. The procedure provided a water-insoluble pronase article. Then, using p-toluenesulfonyl-L-arginine methyl ester, a synthetic substrate, the pronase activity of the above article was determined at 25° C and pH 8.0. It was found that 60% of the original pronase activity had been converted by the coupling reaction into the water-insoluble enzymatic article.

The total protein in the above washings was also determined in accordance with the method of Lowry [O. H. Lowry et al: J. Biol. Chem. 193, 265(1951)] and the value found was substracted from the total protein content of the original pronase. Based on the difference thus found, the percent insolubilization of protein was calculated to be 72%.

Reference Example 10

One gram of the activated PS-2 fiber obtained in Example 5 was suspended in 20 ml of distilled water. To this suspension was added 10 ml of 0.2M phosphate buffer (pH 8.0) as well as 10 ml of a 2.5 mg./ml solution of crystalline α-chymotrypsin (manufactured by Sigma, U.S.A.). This coupling reaction was carried out at 5° C and pH 8.0 The reaction went to completion in 4 hours, at the end of which time 65% of the enzyme protein originally added was found to have been coupled with the carrier.

Using L-tyrosine ethyl ester as a substrate in the presence of 10% ethanol, the esterase activity of the product was determined at 27° C and pH 7.8. The percent insolubilization of activity was found to be 54%.

Reference Example 11

To one gram of the activated PS-1 film obtained in Example 6 was added 20 ml of distilled water as well as 5 ml of a 1% solution of urease (derived from Jack bean, manufactured by Wako Junyaku Kabushiki Kaisha, Japan) and 5 ml of 0.04M phosphate buffer (pH 7.5). The reaction was carried out at 5° C with stirring for 18 hours, whereby 35% of the original enzyme activity was insolubilized. The percent insolubilization of protein was 44%.

Reference Example 12

Strains of microorganisms having α-amino acid ester hydrolase activity were each used to inoculate a 2-liter shake flask containing 500 ml of a medium of the composition indicated in the footnote to Table 2, and shake culture was carried out at 28° C for 24 hours.

The culture broth was centrifuged, and to the cells thus harvested was added 0.1M phosphate buffer (pH 6.0) to prepare 50 ml of a suspension. The suspension was subjected to a ultrasonic disruption procedure at 150 W for 50 minutes. The resultant cell-free extract of α-amino acid ester hydrolase was centrifuged and 1/10 volume part each of 1M potassium secondary phosphate and 1M calcium acetate were added to the supernatant fluid. The mixture was allowed to stand at 5° C for 30 minutes and the resultant calcium phosphate gel was centrifugally separated to obtain a supernatant. One milliliter of this calcium phosphate-treated supernatant was taken into a small common-stoppered test tube, followed by the addition of 0.1 g. of the activated PS-1 obtained by the procedure of Example 3 and 1 ml of 2M phosphate buffer (pH 8.0) together with a sufficient amount of distilled water to make a total of 4 ml. The reaction was carried out under shaking at 5° C for 4 hours, after which time the PS-1 was recovered by means of a glass filter and rinsed with 18 ml of 0.2M glycine solution and 18 ml of 0.5M sodium chloride solution. By this procedure, 40 ml of washings were recovered. The insolubilized enzyme obtained was suspended in 4 ml of distilled water. The enzymatic activity was determined by measuring the rate of hydrolysis with a pH-stat at 27° C and pH 6.0 using 20 mM of D-phenylglycine methyl ester solution as the substrate. The amount of the enzyme which hydrolyzed 1 μ mole of the substrate per minute was taken as unity (u). As to the above washings, the amount of protein in the washings was determined and the amount of bound protein was calculated from the precent recovery rate. In addition, the percent recovery of PS-1-bound activity was divided by the percent recovery of PS-1-bound protein. This relative value represented the ratio of the specific activity of immobilized enzyme to the specific activity of the supernatant fluid obtainable after calcium phosphate treatment and, as will be seen from Table 2, there were selected, as enzymes having the above ratio in excess of 2, the enzymes of five strains of microorganisms, namely *Acetobacter pasteurianus* (IFO 3223, ATCC 6033), *Acetobacter turbidans* (IFO 3225, ATCC 9325), Mycoplana sp. (IFO 13213, ATCC 21759), *Gluconobac-* ter suboxidans (IFO 3432, ATCC 621) and *Xanthomonas sp.* (IFO 13215, ATCC 21764).

Table 2

| Strain | Medium * | Activity bound to PS-1 | | Protein bound to PS-1 | | Percent recovery of activity Percent recovery of protein |
|---|---|---|---|---|---|---|
| | | μ/ml | % Recovery | mg/ml | % Recovery | |
| *Acetobacter pasteurianus* (IFO 3223, ATCC 6033) | PY | 1.20 | 66 | 0.95 | 31 | 2.1 |
| *Acetobacter turbidans* (IFO 3225, ATCC 9325) | PY | 3.20 | 63 | 0.90 | 28 | 2.2 |
| *Mycoplana sp.* (IFO 13213, ATCC 21759) | PY | 0.60 | 54 | 0.81 | 24 | 2.3 |
| *Gluconobacter suboxidans* (IFO 3432, ATCC 621) | PY | 0.38 | 42 | 0.32 | 19 | 2.2 |
| *Xanthomonas sp.* (IFO 13215, ATCC 27164) | NG | 2.32 | 54 | 1.35 | 26 | 2.1 |

* PY medium:
Raw potato, 10 %; yeast extract, 1 %; T.G.C. medium (Daigo), 1 %; glycerin, 1.5 %; glucose, 0.3 %; (pH 7.0)
* NG medium:
Sodium L-glutamate, 0.2 %; yeast extract, 0.2 %; peptone, 0.5 %; potassium secondary phosphate, 0.2 %; magnesium chloride 0.1 %; ferrous sulfate, 0.01 %; sucrose, 2.0 %; (pH 7.2)

Reference Example 13

One-gram portion (on a dry weight basis) of PS-1 activated by the procedures set forth in Example 3, was suspended in 40 ml of distilled water. Then, 20 ml of 0.2M tris-HCl buffer (pH 8) and 20 ml of the supernatant fluid which had been obtained by treating the disrupted cells of *Xanthomonas sp.* (IFO 13215, ATCC 21764) with calcium phosphate as in Reference Example 12 were added to the above suspensions. The reaction was conducted at 5° C and pH 8.0 with stirring for 20 hours, after which time each reaction mixture was filtered through a glass filter to recover the solid fraction. This solid fraction was rinsed with 100 ml of 0.2M glycine solution, 100 ml of 0.5M sodium chloride solution and 200 ml of distilled water in the order mentioned. The water-insoluble enzymatic articles thus obtained was resuspended in distilled water to prepare 40 ml of a suspension. The activity and the amount of bound protein of the resultant water-insoluble enzymatic article were determined. The results are set forth in Table 3.

Table 3

| Carrier | Insolubilized activity | | Insolubilized protein | | Yield of insolubilized activity Yield of insolubilized protein |
|---|---|---|---|---|---|
| | μ/ml | Yield(%) | mg/ml | Yield(%) | |
| PS-1 | 6.38 | 74 | 3.53 | 34 | 2.2 |

Reference Example 14

To 500 ml of the supernatant fluid obtained by the calcium phosphate treatment of *Acetobacter turbidans* (IFO 3225, ATCC 9325) as in Reference Example 12 were added 25 g. of the PS-2 pre-activated with cyanogen bromide as in Example 3, 250 ml of 0.2M phosphate buffer (pH 8.0) and the balance of distilled water to make 1 liter. The reaction was conducted at a constant temperature of 5° C and a constant pH value of 8.0 for 18 hours, after which time the reaction mixture was filtered through a glass filter. The solid fraction was rinsed with 2 l of 0.2M glycine solution, 2 l of 0.5M sodium chloride solution and 2 l of distilled water in the order mentioned. The resultant insolubilized enzyme was suspended in 1 l of 0.01M phosphate buffer (pH 7.0). The activity of this product was 8.30 μ/ml, the yield of activity being about 81%. The protein content was 5.10 mg/ml and the yield of insolubilized protein was 33%. That is to say, there had been an increase in specific activity of 2.5 times.

Reference Example 15

A column with a bed volume of 50 ml was prepared using 200 ml of a suspension of the water-insoluble enzymatic article prepared by the procedure set forth in Reference Example 14. Then, a substrate solution (adjusted to pH 7.0) containing 0.5% of 7-amino-3-desacetoxycephalosporanic acid (7-ADCA), 1.5% of D-phenylglycine methyl ester hydrochloride and 6% of ethanol was passed through the column at 5° C and at a constant flow rate of 100 ml hr. This procedure provided cephalexin at a present conversion rate of about 96%. The titer of cephalexin was assayed photometrically utilizing the cephalosporinase elaborated by *Aelobacter cloacae* (IFO 12937) (T. Takahashi et al, J. Amer. Chem. Soc. 94, 4035(1972).

The reaction mixture containing 7700 μg/ml of cephalexin which had been obtained by the above continuous column procedure, in an amount of 1650 ml, was concentrated to 1,000 ml in a rotary evaporator and the concentrate was passed through a column of activated carbon with a bed volume of 250 ml, whereby the cephalexin was adsorbed. The column was washed with 2,500 ml of distilled water and, then, the cephalexin was eluted with 4% aqueous butanol to recover 1,600 ml of eluate. The eluate was concentrated to substantial dryness and the resultant crystals were recovered by filtration, rinsed with 50 ml of methanol and 50 ml of ethyl ether, followed by drying. The crystals were further dehydrated in a desiccator containing phosphorus pentoxide. The procedure provided 10.3 g. of cephalexin crystals. In this manner, cephalexin was obtained at a synthetic reaction yield of 95%, a purification yield of 81% and an overall yield of 77%.

Reference Example 16

From 40 ml of the PS-1-suppported water-insoluble enzyme suspension prepared in Reference Example 13, there was recovered the solid fraction by filtration. This solid fraction was added to 100 ml of a substrate solution (pH 7.0) containing 0.5% (W/V) of 6-APA, 1.0% (W/V) of D-phenylglycine methyl ester, 12% (V/V) of methanol and 50 mM of phosphate buffer. The reaction was carried out at 25° C with stirring for 3 hours, after which time the water-insoluble enzyme was separated by filtration. The reaction mixture was found to contain 6,800 µg/ml of ampicillin. The above same water-insoluble enzyme was repeatedly used in the ampicillin synthesis reaction under the same conditions as above for a total of five times. The ampicillin contents of the reaction mixtures were 6,850, 6,780, 6,820, 6,730 and 6,750 µg/ml. Thus, the inactivation of the enzyme was substantially nil.

In a rotary evaporator, 600 ml (ampicillin content 6,750 µg/ml of the reaction mixture obtained as above was concentrated to about 200 ml and the concentrate was passed through a column (2.3 × 35 cm) of Amberlite XAD-2 (manufactured by Rhom and Haas Co., U.S.A.), whereby the ampicillin was adsorbed. The column was first washed with 150 ml of 20% aqueous methanol (V/V) and, then, the ampicillin was eluted with 100 ml of 50% aqueous methanol (V/V). The resultant eluate was concentrated to about one-fifth of its initial volume and allowed to stand at 5° C. The resultant ampicillin crystals were recovered by filtration and dried. The procedure provided 3.40 g. of ampicillin crystals (overall yield 71%).

Reference Example 17

A column with a bed volume of 50 ml was prepared using 200 ml of a suspension of the water-insoluble enzymatic article obtained by the procedure set forth in Reference Example 14, and at 5° C, a substrate solution (pH 6.5) containing 0.5% (W/V) of 6-APA, 1.0% (W/V) of D-p-hydroxyphenylglycine methyl ester, 10% (V/V) of ethanol and 75 mM of phosphate buffer (pH 6.5) was passed through the column at a flow rate of 200 ml/day. The above procedure provided a reaction mixture containing 6000 µg/ml of amoxicillin. In a rotary evaporator, 2 l of the above reaction mixture was concentrated to about half its initial volume and cooled. The resultant white crystals were recovered by filtration and the mother liquor was further concentrated to obtain a further crop of similar crystals. The crystals were combined and rinsed with small amounts of water, acetone and ethyl ether in the order mentioned, followed by drying over phosphorus pentoxide. The procedure provided 10.5 g. of crystals (overall yield 66%).

The crystals thus obtained gave a single spot on a thin-layer chromatogram (silica gel) and had an $[\alpha]_D^{25}$ value of +250° (c=0.1%, 0.05NHCl). The elemental analysis and NMR spectrum of this product revealed that it was the trihydrate of 6-[D-α-amino-α-(4-hydroxyphenyl)-acetamido]-penicillanic acid, i.e. amoxicillin.

Reference Example 18

A small column with a bed volume of 5 ml was prepared using 20 ml of the water-insolubilized enzyme obtained in Reference Example 14 and the cephalexin synthesis reaction was carried out at 5° C by passing continuously a substrate solution of the composition indicated in Reference Example 15 at a flow rate of 10 ml./hr. After an elapse of six months, the yield of cephalexin was found to have remained stable at 93–97%. Thus, no inactivation whatever was encountered.

EXAMPLE 1

Ten grams of white PS-1 powder was weighed into a beaker with a capacity of 500 ml. After the addition of 200 ml of distilled water, the suspension was agitated with a magnetic stirrer until the PS-1 was sufficiently swollen. Thereafter, 200 ml. of a 5% (W/V) aqueous solution of cyanogen bromide was added. Under constant stirring at 25° C, a 2N solution of sodium hydroxide was added dropwise by means of an automatic titrator to increase the pH of the suspension at the rate of about 0.5 pH unit/min. until a pH value of 11 was established. The suspension was further maintained at this pH level for about 15 minutes, whereby the reaction was carried to completion.

Following the reaction, the PS-1 particles were recovered from the reaction mixture by filtration and rinsed with 1 l. of distilled water to obtain 10.05 g. (dry weight) of activated PS-1.

EXAMPLE 2

In the same manner as Example 1, 10 g. of white PS-2 powder was activated with cyanogen bromide to obtain 10.08 g. (dry weight) of activated PS-2.

EXAMPLE 3

To one gram of PS-1 was added 20 ml of water and, after the polysaccharide had sufficiently swollen, 20 ml of a 5% (W/V) aqueous solution of cyanogen bromide was added. Under stirring at room temperature, the pH of the reaction mixture was increased to pH 11 at the rate of 0.2 to 0.5 pH units per minute, using an automatic titrator (pH-stat). The reaction was further conducted at a constant pH of 11 for 15 minutes, at the end of which time the solid fraction was recovered by filtration and rinsed well with distilled water. The above procedure provided an activated PS-1.

EXAMPLE 4

To 125 milliliters of PS-1 in the shape of beads (particle diameter 50 – 200 microns) (equivalent to about 5 g. of PS-1 as dry weight) were added 100 ml of water and 100 ml of 5% (W/V) cyanogen bromide.

At 25° C and under stirring, 2N sodium hydroxide solution was added dropwise by means of an automatic titrator in such amounts as to increase the pH gradually at a rate of about 0.5 pH unit per minute until a final pH of 11 was established. The system was held at this pH 11 for about 15 minutes, whereby the reaction was carried to completion. Following this reaction, the solid matter was recovered by filtration and rinsed with 500 ml of distilled water. The above procedure provided an activated bead-shaped PS-1 (dry weight, 5.1 grams).

EXAMPLE 5

Five grams of fibrous PS-2 (diameter, about 0.2 to 0.3 mm; length, about 10 cm) was weighed and treated in the same manner as Example 4. The procedure provided a fibrous activated PS-2 (dry weight, 5.15 grams).

EXAMPLE 6

Five grams of PS-1 in the shape of film (about 0.2 mm thick) was taken and treated in the same manner as Example 4. The procedure provided an activated film-shaped PS-1 (dry weight, 4.95 grams).

What we claim is:

1. A beta-1,3-glucan derivative, which is produced by reacting water-insoluble beta-1,3-glucan produced by microorganisms belonging to the genus Alcaligenes, the genus Agrobacterium or Poria cocos, with cyanogen halide in the presence of water and with the addition of an alkali in an amount such that the pH of the reaction system is sufficiently increased to prevent dissolution of said water-insoluble beta-1,3-glucan, said increase being in the range of about 0.2 to 0.5 pH unit/minute.

2. A beta-1,3-glucan derivative according to claim 1, wherein the water-insoluble beta-1,3-glucan is in the form of powder.

3. A beta-1,3-glucan derivative according to claim 1, wherein the water-insoluble beta-1,3-glucan is in the form of fiber.

4. A beta-1,3-glucan derivative according to claim 1, wherein the water-insoluble beta-1,3-glucan is in the form of film.

5. A beta-1,3-glucan derivative according to claim 1, wherein the water-insoluble beta-1,3-glucan is in the form of bead.

6. A beta-1,3-glucan derivative according to claim 1, wherein the water-insoluble beta-1,3-glucan is produced by a microorganism belonging to the genus Alcaligenes.

7. A beta-1,3-glucan derivative according to claim 1, wherein the water-insoluble beta-1,3-glucan is produced by a microorganism belonging to the genus Agrobacterium.

8. A beta-1,3-glucan derivative according to claim 1, wherein the water-insoluble beta-1,3-glucan is produced by a microorganism belonging to Poria cocos.

* * * * *